United States Patent
Moon

(10) Patent No.: US 9,224,230 B2
(45) Date of Patent: Dec. 29, 2015

(54) METHOD OF DISPLAYING THREE-DIMENSIONAL IMAGE AND DISPLAY APPARATUS FOR PERFORMING THE SAME

(71) Applicant: Samsung Display Co., LTD., Yongin, Gyeonggi-Do (KR)

(72) Inventor: Gyeong-Ub Moon, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 345 days.

(21) Appl. No.: 13/759,394

(22) Filed: Feb. 5, 2013

(65) Prior Publication Data
US 2013/0307844 A1 Nov. 21, 2013

(30) Foreign Application Priority Data
May 15, 2012 (KR) .................. 10-2012-0051521

(51) Int. Cl.
*H04N 13/00* (2006.01)
*G06T 15/00* (2011.01)
*H04N 13/04* (2006.01)
*G02B 27/26* (2006.01)

(52) U.S. Cl.
CPC ............. *G06T 15/00* (2013.01); *G02B 27/26* (2013.01); *H04N 13/0404* (2013.01); *H04N 13/0409* (2013.01); *H04N 13/0434* (2013.01)

(58) Field of Classification Search
CPC ........... H04N 13/044; H04N 13/0429; H04N 13/0431; H04N 13/0434; H04N 13/0436; H04N 13/0438
USPC .................. 348/53–59; 349/15; 359/464, 465
See application file for complete search history.

(56) References Cited

U.S. PATENT DOCUMENTS

| | | | |
|---|---|---|---|
| 5,315,377 A * | 5/1994 | Isono et al. ..................... 348/51 |
| 6,084,647 A * | 7/2000 | Hatano et al. ................... 349/15 |
| 6,246,451 B1 * | 6/2001 | Matsumura et al. ............ 349/15 |
| 7,215,475 B2 * | 5/2007 | Woodgate et al. ............ 359/624 |
| 7,786,953 B2 * | 8/2010 | Saishu ............... 345/4 |
| 8,836,775 B2 * | 9/2014 | Baek ............... 348/58 |
| 8,848,116 B2 * | 9/2014 | He et al. ..................... 349/15 |
| 8,913,205 B2 * | 12/2014 | Robinson et al. .............. 349/37 |
| 8,953,106 B2 * | 2/2015 | Nakahata .................. 349/15 |
| 2002/0113866 A1 * | 8/2002 | Taniguchi et al. .............. 348/51 |
| 2007/0229951 A1 | 10/2007 | Jung et al. |
| 2008/0266388 A1 * | 10/2008 | Woodgate et al. ............. 348/59 |
| 2008/0303963 A1 | 12/2008 | Jung et al. |
| 2009/0153653 A1 * | 6/2009 | Lee et al. ................ 348/59 |
| 2010/0238276 A1 * | 9/2010 | Takagi et al. .................. 348/54 |

(Continued)

FOREIGN PATENT DOCUMENTS

| KR | 0728158 B1 | 6/2007 |
| KR | 0910969 B1 | 7/2009 |

*Primary Examiner* — Victor Kostak
(74) *Attorney, Agent, or Firm* — Cantor Colburn LLP

(57) ABSTRACT

A method of displaying a three-dimensional ("3D") image includes generating a frame image including a plurality of image blocks having a left-eye image and a right-eye image which are alternately arranged, the frame image displayed on a display panel and driving each of a plurality of shutter blocks in an active 3D panel as a first mode corresponding to the left-eye image or a second mode corresponding to the right-eye image so that left and right eyes of the viewer view the left-eye image and the right-eye image.

20 Claims, 11 Drawing Sheets

(56) References Cited

U.S. PATENT DOCUMENTS

| | | | |
|---|---|---|---|
| 2011/0205335 A1* | 8/2011 | Kim et al. | 348/43 |
| 2012/0002123 A1* | 1/2012 | Kang | 349/15 |
| 2012/0147161 A1* | 6/2012 | Kim | 348/58 |
| 2012/0182406 A1* | 7/2012 | Woo | 348/54 |
| 2012/0229442 A1* | 9/2012 | Inoue | 345/212 |
| 2012/0229719 A1* | 9/2012 | Ishiguro | 349/15 |

* cited by examiner

METHOD OF DISPLAYING THREE-DIMENSIONAL IMAGE AND DISPLAY APPARATUS FOR PERFORMING THE SAME

This application claims priority to Korean Patent Application No. 10-2012-0051521, filed on May 15, 2012, and all the benefits accruing therefrom under 35 U.S.C. §119, the content of which in its entirety is herein incorporated by reference.

BACKGROUND

1. Field

Exemplary embodiments of the invention relate to a method of displaying a three-dimensional ("3D") image and a display apparatus for performing the mentioned method. More particularly, exemplary embodiments of the invention relate to a method of displaying a 3D image with improved display quality and a display apparatus for performing the method.

2. Description of the Related Art

Generally, a liquid crystal display ("LCD") displays a two-dimensional ("2D") image. Recently, the LCD that displays the 3D image has been developed as demands for the 3D image has been increased in various industrial fields such as games, movies and so on.

Generally, a 3D image display apparatus displays the 3D image using the principle of binocular parallax through two eyes of human. For example, since two eyes of human are spaced apart from each other, images viewed at the different angles are inputted though the two eyes to the brain of human. Thus, a viewer may watch the 3D image to recognize the stereoscopic image through the display apparatus.

The 3D image display apparatus is typically classified into a stereoscopic type with an extra spectacle and an auto-stereoscopic type without the extra spectacle. The stereoscopic type includes a passive polarized glasses method with a polarized filter having a different polarized axis according to two eyes, and an active shutter glasses method. In the active shutter glasses method, a left-eye frame image and a right-eye frame image are temporally-divided to be periodically displayed, and a viewer wears a pair of glasses which sequentially open or close a left-eye shutter and a right-eye shutter, respectively, synchronized with the periods of the left-eye frame image and the right-eye frame image.

The 3D image display apparatus may have a crosstalk that occur when the left-eye image with the right-eye image are mixed due to a liquid crystal response time. When the 3D image display apparatus displays the left-eye or right-eye image along a scan direction which progresses from an upper area toward a lower area of the 3D image display apparatus, the crosstalk of the lower area is viewed more than the crosstalk of the upper area. As described above, the display quality of the 3D stereoscopic image may be decreased by the unbalanced crosstalk.

SUMMARY

Exemplary embodiments of the invention provide a method of displaying a three-dimensional ("3D") image with improved display quality of a 3D image.

Exemplary embodiments of the invention provide a display apparatus that performs the method of displaying a 3D image.

According to an exemplary embodiment of the invention, a method of displaying a 3D image includes generating a frame image to be displayed on a display panel, where the frame image comprises a plurality of image blocks, and the image blocks have a left-eye image and a right-eye image which are alternately arranged, and driving each of a plurality of shutter blocks in an active 3D panel in a first mode corresponding to the left-eye image or a second mode corresponding to the right-eye image such that a left eye and a right eye of a viewer view the left-eye image and the right-eye image, respectively.

In an exemplary embodiment, each of the shutter blocks may include a plurality of shutter electrodes arranged substantially in a matrix form, and the active 3D panel may be sequentially driven in a scanning direction of the display panel.

In an exemplary embodiment, each of the image blocks may extend in a horizontal direction, and the image blocks may be arranged in a vertical direction.

In an exemplary embodiment, each of the image blocks may extend in a vertical direction, and the image blocks be arranged in a horizontal direction.

In an exemplary embodiment, the image blocks may be arranged substantially in a matrix form.

In an exemplary embodiment, the method may further include turning off the active 3D panel during a transition period preset in an early part of a frame period.

In an exemplary embodiment, the method may further include sequentially driving a plurality of light-emitting blocks in a scanning direction of the display panel, where the light-emitting blocks may be turned off during a transition period preset in an early part of a frame period, driven to have a low luminance level lower than the a reference luminance level during a first period after the transition period, and driven to have a boosting luminance level higher than the reference luminance level during a second period after the first period.

In an exemplary embodiment, the method may further include sequentially driving a plurality of light-emitting blocks in a scanning direction of the display panel, where the light-emitting blocks may be driven to have a low luminance level lower than the a reference luminance level during a transition period preset in an early part of a frame period, and driven to have a boosting luminance level higher than the reference luminance level during a remainder period of the frame period after the transition period.

In an exemplary embodiment, the active 3D panel may be an active polarization panel, and the active polarization panel may change the left-eye image into the left-eye image of a first polarized-light in the first mode and change the right-eye image into the right-eye image of a second polarized-light in the second mode.

In an exemplary embodiment, the active 3D panel may be an active barrier panel, and the active barrier panel may operate as a first barrier pattern which directs the left-eye image toward the left-eye of the viewer in the first mode and operate as a second barrier pattern which directs the right-eye image toward the right-eye of the viewer in the second mode.

In an exemplary embodiment, the active 3D panel may be an active lens panel, and the active lens panel may operate as a first lens pattern which directs the left-eye image toward the left-eye of the viewer in the first mode and operate as a second lens pattern which directs the right-eye image toward the right-eye of the viewer in the second mode.

According to an exemplary embodiment of the invention, a display apparatus includes an image processing part which generates a frame image including a plurality of image blocks, where the image blocks includes a left-eye image and a right-eye image which are alternately arranged, a display panel which displays the frame image, and an active 3D panel including a plurality of shutter blocks, where the active 3D panel drives each of the shutter blocks in a first mode corresponding to the left-eye image or a second mode corresponding to the right-eye image such that a left eye and a right eye of a viewer view the left-eye image and the right-eye image.

In an exemplary embodiment, the shutter blocks may include a plurality of shutter electrodes arranged substantially in a matrix form, and the active 3D panel may be sequentially driven in a scanning direction of the display panel.

In an exemplary embodiment, the display apparatus may further include a 3D driving part which turns off the active 3D panel during a transition period preset in an early part of a frame period.

In an exemplary embodiment, the display apparatus may further include a light-source including a plurality of light-emitting blocks, and a light-source driving part which sequentially drives the light-emitting blocks in a scanning direction of the display panel.

In an exemplary embodiment, the light-source driving part may turn off the light-emitting blocks during a transition period preset in an early part of a frame period, drive the light-emitting blocks to have a low luminance level lower than the a reference luminance level during a first period after the transition period, and drive the light-emitting blocks to have a boosting luminance level higher than the reference luminance level during a second period after the first period.

In an exemplary embodiment, the light-source driving part may drive the light-emitting blocks to have a low luminance level lower than the a reference luminance level during a transition period preset in an early part of a frame period, and drive the light-emitting blocks to have a boosting luminance level higher than the reference luminance level during a remaining period of the frame period after the transition period.

In an exemplary embodiment, the active 3D panel may be an active polarization panel, and the active polarization panel may change the left-eye image into the left-eye image of a first polarized-light in the first mode and change the right-eye image into the right-eye image of a second polarized-light in the second mode.

In an exemplary embodiment, the active 3D panel may be an active barrier panel, and the active barrier panel may operate as a first barrier pattern condensing the left-eye image toward the left-eye of the viewer in the first mode and operate as a second barrier pattern condensing the right-eye image toward the right-eye of the viewer in the second mode.

In an exemplary embodiment, the active 3D panel may be an active lens panel, the active lens panel may operate as a first lens pattern which directs the left-eye image toward the left-eye of the viewer in the first mode and operate as a second lens pattern which directs the right-eye image toward the right-eye of the viewer in the second mode.

According to exemplary embodiments of the invention, a flicker of the 3D image, which may occur between an odd-numbered frame and an even-numbered frame, is substantially decreased. In an exemplary embodiment, at least one of the active 3D panel and the light-source operates based on an liquid crystal response time such that a crosstalk of the 3D image that may occur during a transition period, during which a frame image displayed on the display panel is changed from an odd frame image into an even frame image, is substantially decreased, and display quality of the 3D image is thereby substantially improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
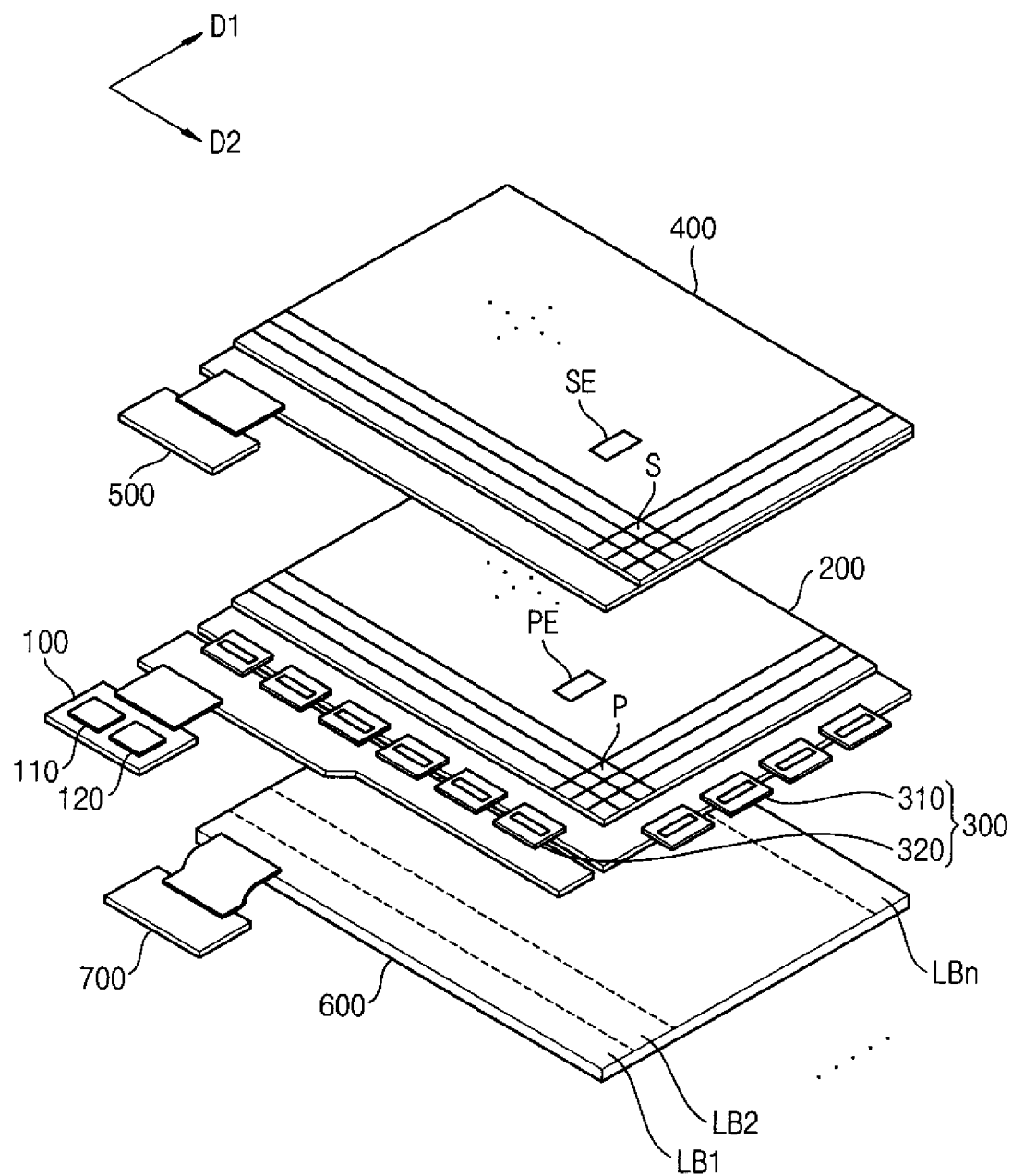
FIG. 1 is a exploded perspective view of an exemplary embodiment of a display apparatus according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

FIG. 1 is an exploded perspective view of an exemplary embodiment of a three-dimensional ("3D") image display apparatus according to the invention.

Referring to FIG. 1, the 3D image display apparatus may include a main driving part 100, a display panel 200, a display driving part 300, an active 3D panel 400, a 3D driving part 500, a light-source 600 and a light-source driving part 700.

The main driving part 100 may include a control part 110 and an image processing part 120. The control part 110 controls the display driving part 300 and the 3D driving part 500 to drive the display panel 200 in synchronization with the active 3D panel 400. The image processing part 120 generates a frame image to be displayed on the display panel 200, and the frame image includes a plurality of image blocks which alternately displays a left-eye image and a right-eye image.

According to an exemplary embodiment, the image processing part 120 generates the frame image which includes a first image block including the left-eye image and a second image block including the right-eye image. In one exemplary embodiment, for example, when a frame period is about 1/120 second, the image processing part 120 generates an odd frame image corresponding to an odd-numbered frame ODD_FRAME (shown in FIG. 3), and the odd frame image includes the first image block including the left-eye image and the second image block including the right-eye image. In such an embodiment, the image processing part 120 generates an even frame image corresponding to an even-numbered frame EVEN_FRAME (shown in FIG. 3), and the even frame image includes the first image block including the right-eye image and the second image block including the left-eye image.

The display panel 200 includes a plurality of subpixels P arranged substantially in a matrix form, e.g., arranged in a first direction D1 and a second direction D2 crossing the first direction D1, and each of the subpixels includes a pixel electrode PE.

The display driving part 300 includes a gate driving part 310 and a data driving part 320. The gate driving part 310 generates a gate signal and sequentially provides the gate signal to a plurality of gate lines of the display panel 200 arranged in the first direction D1 with the gate signal. The data driving part 320 sequentially provides a data signal to a plurality of data lines of the display panel 200 arranged in the second direction D2 in synchronization with output timing of the gate signal.

The display driving part 300 displays the odd frame image on the display panel 200 during the odd-numbered frame ODD_FRAME, and displays the even frame image including the left-eye and right-eye images, arranged opposite to the arrangement of the odd frame image on the display panel 200 during the even-numbered frame EVEN_FRAME.

The active 3D panel 400 includes a plurality of shutters S arranged substantially in a matrix form, e.g., arranged in the first direction D1 and the second direction D2. Each of the shutters S includes a shutter electrode SE corresponding to the pixel electrode PE of a corresponding subpixel P. According to an exemplary embodiment, the display panel 200 is disposed between the active 3D panel 400 and the light-source 600. The active 3D panel 400 directs, e.g., focuses, light transmitted from the display panel 200 toward a position of a viewer, e.g., toward the left and right eyes of the viewer.

The 3D driving part 500 sequentially drives the shutters S of the active 3D panel 400 in synchronization with a display timing of the frame image, which is displayed in the scanning direction on the display panel 200.

The 3D driving part 500 divides the active 3D panel 400 into a left-eye shutter block and a right-eye shutter block corresponding to the image blocks including the left-eye and right-eye images generated from the image processing part 120. The 3D driving part 500 drives the left-eye shutter block and the right-eye shutter block such that the left and right eyes of the viewer view the left-eye image and the right-eye image, respectively. In one exemplary embodiment, for example, the shutters S of the left-eye shutter block corresponding to the image block including the left-eye image drive to allow the left-eye of the viewer to view the left-eye image. The shutters S of the right-eye shutter block corresponding to the image block including the right-eye image drive to allow the right-eye of the viewer to view the right-eye image. The left-eye and right-eye shutter blocks corresponding to the odd-numbered frame ODD_FRAME are opposite to the left-eye and right-eye shutter blocks corresponding to the even-numbered frame EVEN_FRAME.

Accordingly, the left-eye image of the frame image displayed on the display panel 200 may be viewed through the viewer's left-eye and the right-eye image of the frame image displayed on the display panel 200 may be viewed through the viewer's right-eye to allow the viewer to view the 3D image.

The light-source 600 generates light and provides the display panel 200 with the light. In an exemplary embodiment, the light-source 600 may be an edge-illumination type which includes a light-source disposed at a side portion of a light guide plate, but the invention is not limited thereto. In an alternative exemplary embodiment, the light-source 600 may be a direct-illumination type which includes a light-source disposed under the display panel 200 and corresponding to an entire area of the display panel 200.

According to an exemplary embodiment, the light-source 600 includes a plurality of light-emitting blocks LB1, LB2, . . . , LBn arranged in the scanning direction.

The light-source driving part 700 sequentially drives the light-emitting blocks LB1, LB2, . . . , LBn to emit light in synchronization with display timing of the frame image displayed on the display panel 200.

Figure 2:
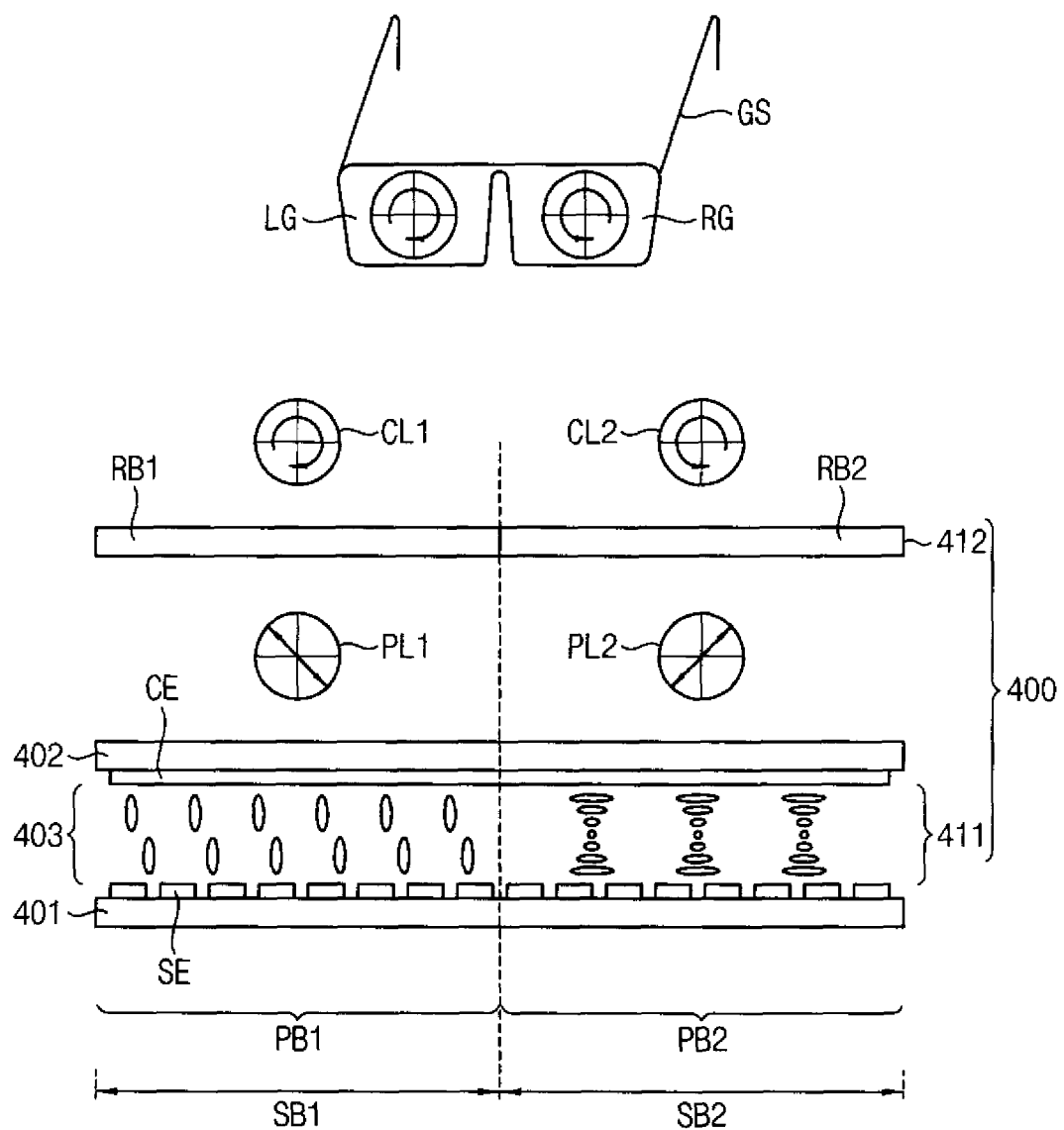
FIG. 2 is a conceptual diagram illustrating an exemplary embodiment of an active three-dimensional ("3D") panel according to the invention.

FIG. 2 is a conceptual diagram illustrating an exemplary embodiment of an active 3D panel according to the invention.

Referring to FIGS. 1 and 2, in an exemplary embodiment, the active 3D panel 400 may include an active polarization panel 411 and an active retarder panel 412. The active 3D panel 400 is divided into a plurality of shutter blocks SB1 and SB2 corresponding to a plurality of image blocks of the frame image, and the shutter blocks are driven corresponding to the left-eye image and the right-eye image in the image blocks.

The active polarization panel 411 may include a first substrate 401, a second substrate 402 and a liquid crystal ("LC") layer 403.

The first substrate 401 includes a plurality of shutter electrodes SE and the second substrate 402 includes a common electrode CE opposite to the shutter electrodes SE. The LC layer 403 operates in a first polarization mode and a second polarization mode based on driving signals applied to the shutter electrodes SE.

In such an embodiment, the active polarization panel 411 is divided into a plurality of polarization blocks PB1 and PB2 corresponding to the shutter blocks SB1 and SB2. The active polarization panel 411 operates in the first polarization mode, in which incident light is changed into first polarized-light PL1 or in a second polarization mode, in which incident light is changed into a second polarized-light PL2, based on the 3D image.

In one exemplary embodiment, for example, a first polarization block PB1 corresponding to the image block including the left-eye image operates in the first polarization mode such that the incident light transmitted through the first polarization mode is changed into the first polarized-light PL1. A second polarization block PB2 corresponding to the image block including the right-eye image operates in the second polarization mode such that the incident light transmitted through the second polarization mode is changed into the second polarized-light PL2.

The active retarder panel 412 operates in the first retarder mode and the second retarder mode based on driving signals applied to the active retarder panel 412.

The active retarder panel 412 is divided into a plurality of retarder blocks RB 1 and RB2 corresponding to the shutter blocks SB1 and SB2. The active retarder panel 412 operates in a first retarder mode, in which incident light is changed into a first circularly polarized-light CL1 or in a second retarder mode, in which the incident light is changed into a second circularly polarized-light CL2, based on the 3D image.

In such an embodiment, the active retarder panel 412 is divided into a plurality of retarder blocks corresponding to a plurality of polarization blocks in the active polarization panel 411 and the retarder blocks operate in the first retarder mode and the second retarder mode corresponding to the polarization blocks.

In one exemplary embodiment, for example, a first retarder block RB1 corresponding to the first polarization block PB1 operates in the first retarder mode such that the first polarized-light PL1 is changed into a first circularly polarized-light CL1. A second retarder block RB2 corresponding to the second polarization block PB2 operates in the second retarder mode such that the second polarized-light PL2 is changed into a second circularly polarized-light.

In such an embodiment, the first circularly polarized-light CL1 changed through the first retarder block RB1 is incident into a left-eye part LG of a polarization glasses GS such that the left-eye of the viewer may view the left-eye image of the first circularly polarized-light CL1. In such an embodiment, the second circularly polarized-light CL2 changed through the second retarder block RB2 is incident into a right-eye part RG of the polarization glasses GS such that the right-eye of the viewer may view the right-eye image of the second circularly polarized-light CL2.

According to an exemplary embodiment, the shutter blocks SB1 and SB2 of the active 3D panel 400 may change the left-eye image and the right-eye image displayed by the image block into polarized-light different from each other to allow the left and right eyes of the viewer to view the corresponding 3D image.

Figure 3:
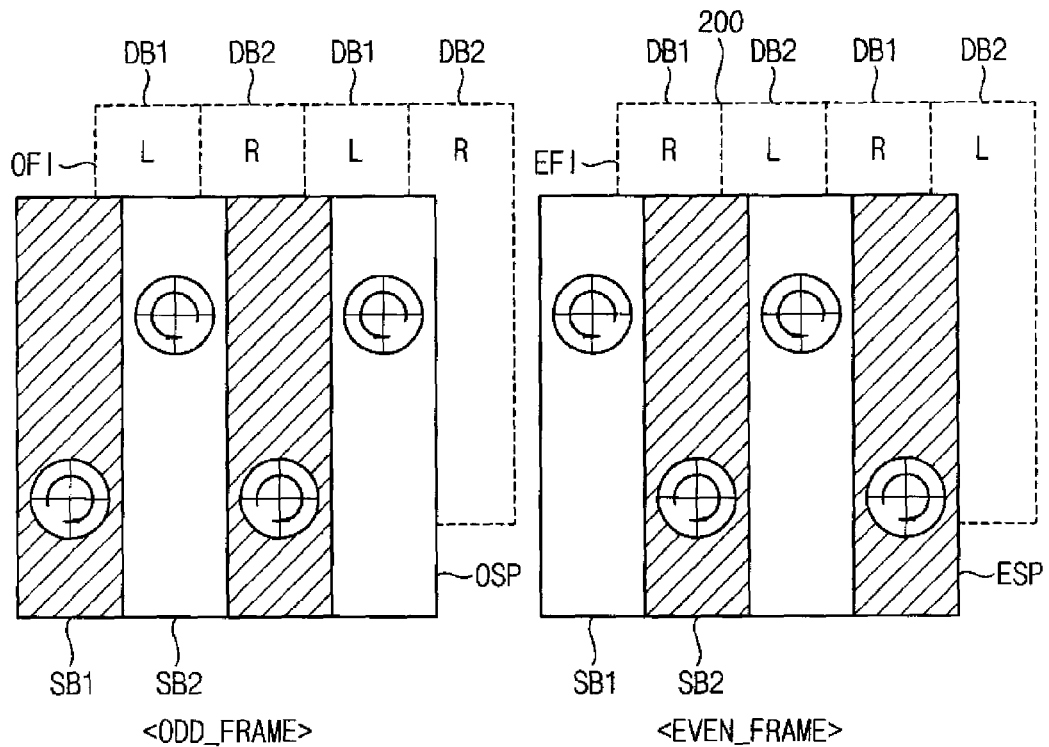
FIG. 3 is a conceptual diagram illustrating an exemplary embodiment of a method of driving the active 3D panel as shown in FIG. 2.

FIG. 3 is a conceptual diagram illustrating an exemplary embodiment of a method of driving the active 3D panel as shown in FIG. 2.

Referring to FIGS. 2 and 3, in an exemplary embodiment, the frame image displayed on the display panel 200 may include a plurality of image blocks substantially in a vertical stripe shape, e.g., each image block extends in a vertical direction and the image blocks are arranged in a horizontal direction. The image blocks alternately display the left-eye image and the right-eye image.

In one exemplary embodiment, for example, as shown in FIG. 3, the odd frame image OFI, which is displayed on the display panel 200 during the odd-numbered frame ODD_FRAME, includes a first image block DB1 including the left-eye image L and a second image block DB2 including the right-eye image R.

In such an embodiment, the active 3D panel 400 includes a first shutter block SB1 and a second shutter block SB2 and operates as an odd 3D pattern OSP corresponding to the odd frame image OFI. The first shutter block SB1 of the odd 3D pattern OSP operates in the first polarization mode corresponding to the first image block DB1. The second shutter block SB2 of the odd 3D pattern OSP operates in the second polarization mode corresponding to the second image block DB2. The incident light is changed into the first circularly polarized-light CL1 in the first polarization mode, and the incident light is changed into the second circularly polarized-light CL2 in the second polarization mode.

An even frame image EFI, which is displayed on the display panel 200 during the even-numbered frame EVEN_FRAME, is opposite to the odd frame image OFI. As shown in FIG. 3, the even frame image EFI includes a second image block DB2 including the left-eye image L and a first image block DB 1 including the right-eye image R.

In such an embodiment, the active 3D panel 400 includes a first shutter block SB1 and a second shutter block SB2 and operates as an even 3D pattern ESP corresponding to the even frame image EFI. The first shutter block SB1 of the even 3D pattern ESP corresponding to the first image block DB1 operates in the second polarization mode corresponding to the right-eye image R, and the second shutter block SB2 of the even 3D pattern ESP corresponding to the second image block DB2 operates in the first polarization mode corresponding to the left-eye image L.

According to an exemplary embodiment, the left-eye image and the right-eye image are included in the frame image, and a flicker of the 3D image is thereby substantially decreased compared to a method of alternately displaying a left-eye frame image and a right-eye frame image every frame period.

Figure 4:
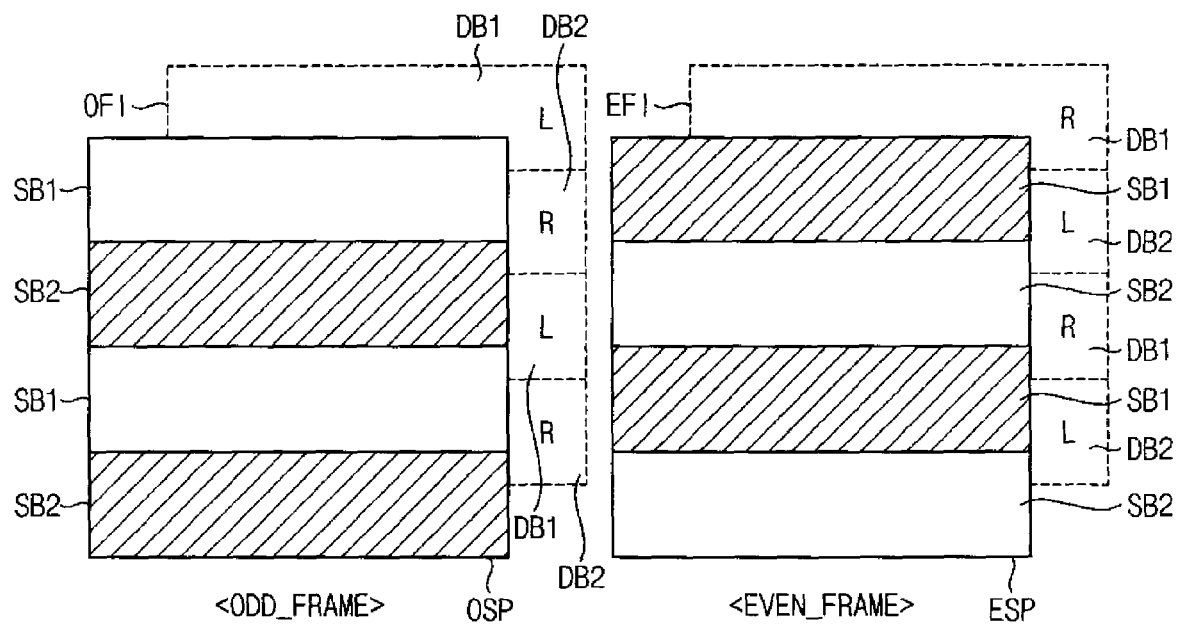
FIG. 4 is a conceptual diagram illustrating an alternative exemplary embodiment of a method of displaying an 3D image according to the invention.

FIG. 4 is a conceptual diagram illustrating an alternative exemplary embodiment of a method of displaying a 3D image according to the invention.

Referring to FIGS. 2 and 4, according to the exemplary embodiment, the frame image includes a plurality of image blocks substantially in a horizontal stripe shape, e.g., each image block extends in a horizontal direction and the image blocks are arranged in the vertical direction. The image blocks alternately display the left-eye image and the right-eye image.

In one exemplary embodiment, for example, an odd frame image OFI, which is displayed on the display panel 200 during the odd-numbered frame ODD_FRAME, includes a first image block DB1 including the left-eye image L and a second image block DB2 including the right-eye image R.

In such an embodiment, the active 3D panel 400 includes a first shutter block SB1 and a second shutter block SB2 and operates as an odd 3D pattern OSP corresponding to the odd frame image OFI. The first shutter block SB1 of the odd 3D pattern OSP corresponding to the first image block DB1 operates in the first polarization mode corresponding to the left-eye image L, and the second shutter block SB2 of the odd 3D pattern OSP corresponding to the second image block DB2 operates in the second polarization mode corresponding to the right-eye image R.

An even frame image EFI, which is displayed on the display panel 200 during the even-numbered frame EVEN_FRAME, is opposite to the odd frame image OFI. As shown in FIG. 4, the even frame image EFI includes a second image block DB2 including the left-eye image L and a first image block DB 1 including the right-eye image R.

In such an embodiment, the active 3D panel 400 includes a first shutter block SB1 and a second shutter block SB2 and operates as an even 3D pattern ESP corresponding to the even frame image EFI. The first shutter block SB1 of the even 3D pattern ESP corresponding to the first image block DB1 operates in the second polarization mode corresponding to the right-eye image R, and the second shutter block SB2 of the even 3D pattern ESP corresponding to the second image block DB2 operates in the first polarization mode corresponding to the left-eye image L.

According to an exemplary embodiment, the left-eye image and the right-eye image are included in the frame image, and a flicker of the 3D image is thereby substantially decreased compared to a method of alternately displaying the left-eye frame image and the right-eye frame image every frame period.

Figure 5:
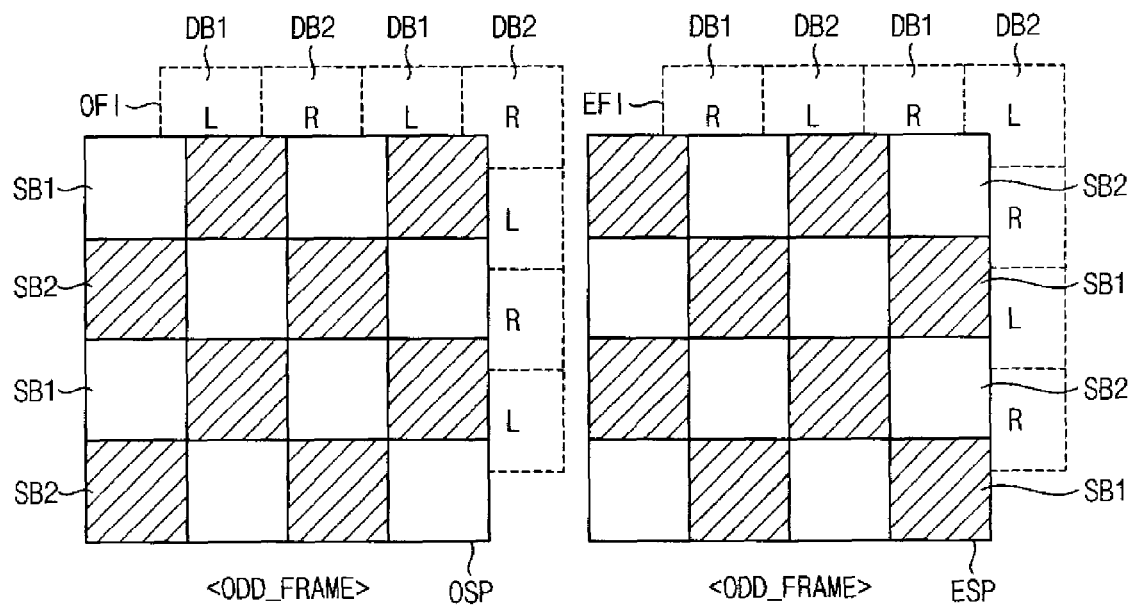
FIG. 5 is a conceptual diagram illustrating another alternative exemplary embodiment of a method of displaying an 3D image according to the invention.

FIG. 5 is a conceptual diagram illustrating another alternative exemplary embodiment of a method of displaying a 3D image according to the invention.

Referring to FIGS. 2 and 5, according to an exemplary embodiment, the frame image includes a plurality of image blocks substantially in a dot shape, e.g., the image blocks are arranged substantially in a matrix shape, and the image blocks alternately display the left-eye image and the right-eye image.

In one exemplary embodiment, for example, an odd frame image OFI, which is displayed on the display panel 200 during the odd-numbered frame ODD_FRAME, includes a first image block DB1 including the left-eye image L and a second image block DB2 including the right-eye image R.

In such an embodiment, the active 3D panel 400 includes a first shutter block SB1 and a second shutter block SB2 and operates as an odd 3D pattern OSP corresponding to the odd frame image OFI. The first shutter block SB1 of the odd 3D pattern OSP corresponding to the first image block DB1 operates in the first polarization mode corresponding to the left-eye image L, and the second shutter block SB2 of the odd 3D pattern OSP corresponding to the second image block DB2 operates in the second polarization mode corresponding to the right-eye image R.

An even frame image EFI, which is displayed on the display panel 200 during the even-numbered frame EVEN_FRAME, is opposite to the odd frame image OFI. As shown in FIG. 5, the even frame image EFI includes a second image block DB2 including the left-eye image L and a first image block DB 1 including the right-eye image R.

In such an embodiment, the active 3D panel 400 includes a first shutter block SB1 and a second shutter block SB2 and operates as an even 3D pattern ESP corresponding to the even frame image EFI. The first shutter block SB1 of the even 3D pattern ESP corresponding to the first image block DB1 operates in the second polarization mode corresponding to the right-eye image R, and the second shutter block SB2 of the even 3D pattern ESP corresponding to the second image block DB2 operates in the first polarization mode corresponding to the left-eye image L.

According to an exemplary embodiment, the left-eye image and the right-eye image are included in the frame image, and a flicker of the 3D image is thereby substantially decreased compared to a method of alternately displaying a left-eye frame image and a right-eye frame image every frame period.

Figure 6:
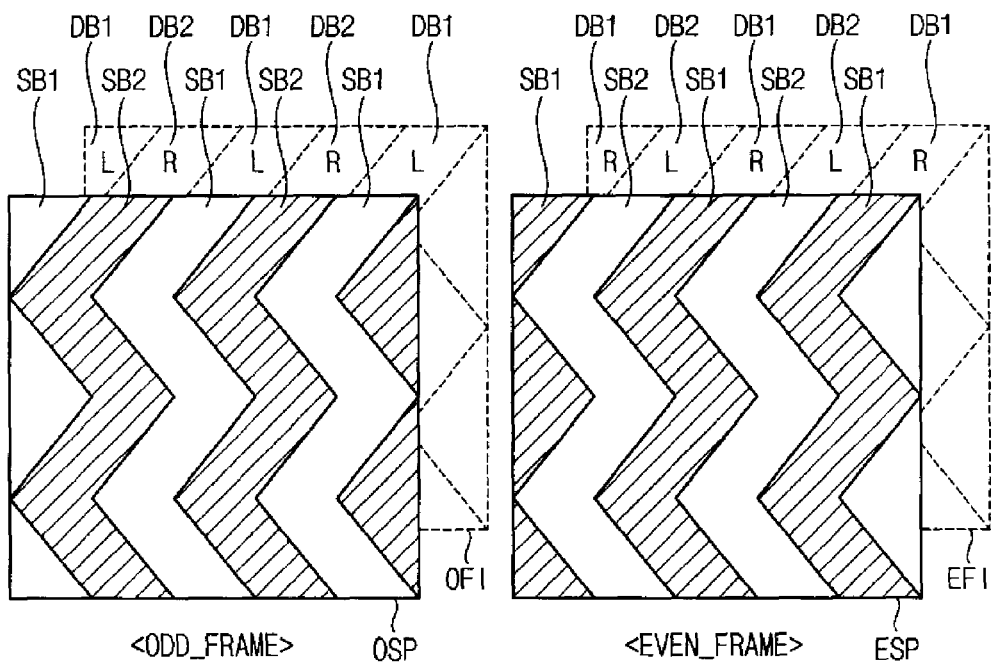
FIG. 6 is a conceptual diagram illustrating another alternative exemplary embodiment of a method of driving an active 3D panel according to the invention.

FIG. 6 is a conceptual diagram illustrating another alternative exemplary embodiment of a method of driving an active 3D panel according to the invention.

Referring to FIGS. 2 and 6, according to an exemplary embodiment, the frame image includes a plurality of image blocks which extends in a vertical direction with a zig-zag shape and is arranged in a horizontal direction, and the image blocks alternately display the left-eye image and the right-eye image.

In one exemplary embodiment, for example, an odd frame image OFI, which is displayed on the display panel 200 during the odd-numbered frame ODD_FRAME, includes a first image block DB1 including the left-eye image L and a second image block DB2 including the right-eye image R.

In such an embodiment, the active 3D panel 400 includes a first shutter block SB1 and a second shutter block SB2 and operates as an odd 3D pattern OSP corresponding to the odd frame image OFI. The first shutter block SB1 of the odd 3D pattern OSP corresponding to the first image block DB1 operates in the first polarization mode corresponding to the left-eye image L, and the second shutter block SB2 of the odd 3D pattern OSP corresponding to the second image block DB2 operates in the second polarization mode corresponding to the right-eye image R.

An even frame image EFI, which is displayed on the display panel 200 during the even-numbered frame EVEN_FRAME, is opposite to the odd frame image OFI. As shown in FIG. 5, the even frame image EFI includes a second image block DB2 including the left-eye image L and a first image block DB 1 including the right-eye image R.

Thus, the active 3D panel 400 includes a first shutter block SB1 and a second shutter block SB2 and operates as an even 3D pattern ESP corresponding to the even frame image EFI. The first shutter block SB1 of the even 3D pattern ESP corresponding to the first image block DB1 operates in the second polarization mode corresponding to the right-eye image R, and the second shutter block SB2 of the even 3D pattern ESP corresponding to the second image block DB2 operates in the first polarization mode corresponding to the left-eye image L.

Although not shown in figures, in an alternative exemplary embodiment, the frame image may include a plurality of image blocks which extends in a horizontal direction with a zig-zag shape and is arranged in a vertical direction. In such an embodiment, the active 3D panel 410 includes a shutter block corresponding to the image block, and the shutter block operates in the first or second polarization mode based on the left-eye or right-eye image in the image block.

According to an exemplary embodiment, the left-eye image and the right-eye image are included in the frame image, and a flicker of the 3D image is thereby substantially decreased compared to a method of alternately displaying a left-eye frame image and a right-eye frame image every frame period.

According to an exemplary embodiment, the active 3D panel includes the shutter electrodes arranged substantially in a matrix form, and the shutter electrodes may respectively correspond to the pixel electrodes of the display panel. Therefore, in an exemplary embodiment, the active 3D panel may include the shutter blocks in various different shapes other than the vertical stripe shape, the horizontal stripe shape, the dot shape and the zig-zag shape in the exemplary embodiments described above.

Figure 7:
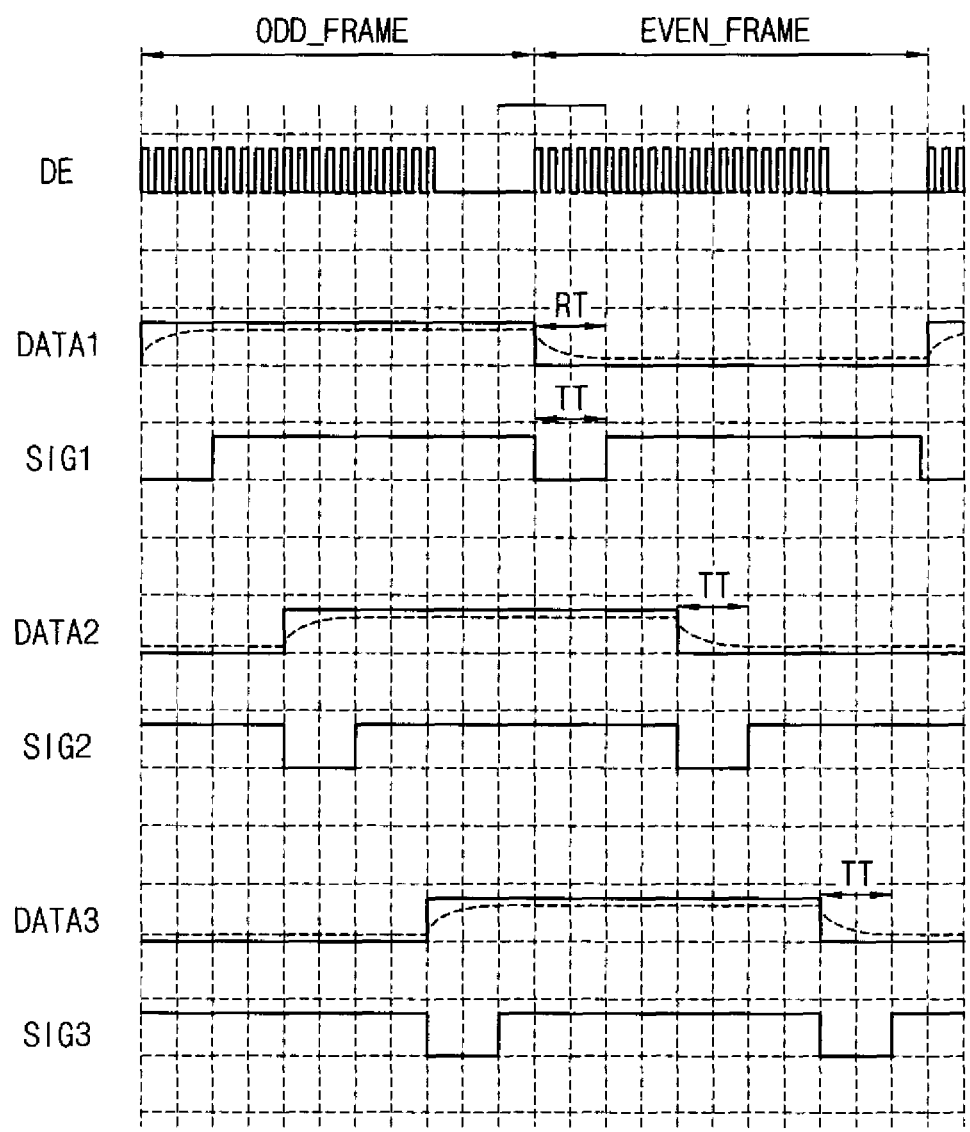
FIG. 7 is a signal timing diagram illustrating an exemplary embodiment of a method of driving an active 3D panel according to the invention.

FIG. 7 is a signal timing diagram illustrating an exemplary embodiment of a method of driving an active 3D panel according to the invention.

Hereinafter, for convenience of description, the odd frame image OFI will be referred to as a white image and the even frame image EFI will be referred to as a block image. In an exemplary embodiment, the active 3D panel 400 may be divided into an upper area, a middle area and a lower area in the scanning direction, and such an embodiment of a method of driving the upper area, the middle area and the lower area of the active 3D panel 400 will now be described in detail.

Referring to FIGS. 1, 3 and 7, during the odd-numbered frame ODD_FRAME, a data signal of the odd frame image OFI is sequentially applied to the upper area, the middle area and the lower area of the display panel 200 in the scanning direction.

In one exemplary embodiment, for example, a first data signal DATA1 of the odd frame image OFI is applied to the upper area of the display panel 200, a second data signal DATA2 of the odd frame image OFI is applied to the middle area of the display panel 200 and a third data signal DATA3 of the odd frame image OFI is applied to the lower area of the display panel 200.

In such an embodiment, a first driving signal SIG1 of the odd 3D pattern OSP is applied to an upper area of the active 3D panel 400, a second driving signal SIG2 of the odd 3D pattern OSP is applied to a middle area of the active 3D panel 400, and a third driving signal SIG3 of the odd 3D pattern OSP is applied to the lower area of the active 3D panel 400, in synchronization with a driving timing of the display panel 200.

In such an embodiment, during the even-numbered frame EVEN_FRAME, a first data signal DATA1 of the even frame image EFI is applied to the upper area of the display panel 200, a second data signal DATA2 of the even frame image EFI is applied to the middle area of the display panel 200, and a third data signal DATA3 of the even frame image EFI is applied to the lower area of the display panel 200.

In such an embodiment, a first driving signal SIG1 of the even 3D pattern ESP is applied to an upper area of the active 3D panel 400, a second driving signal SIG2 of the even 3D pattern ESP is applied to a middle area of the active 3D panel 400, and a third driving signal SIG3 of the even 3D pattern ESP is applied to the lower area of the active 3D panel 400, in synchronization with a driving timing of the display panel 200.

Referring to the first data signal DATA1 applied to the upper area of the display panel 200, the even frame image EFI is displayed without a crosstalk on the upper area from a timing delayed by an LC response time RT from when the first data signal DATA1 of the even frame image EFI is applied to the upper area.

In such an embodiment, a driving period of the display panel 200 includes a transition period TT during which the odd or even frame image OFI or EFI is changed into the even or odd frame image EFI or OFI, respectively. The transition period TT may be preset in an early part of a frame period, e.g., from an initial point of the frame period to a predetermined time point of the frame period. In the transition period TT, the display panel 200 may display a crosstalk image, in which the odd frame image OFI and the even frame image EFI are mixed.

Therefore, according to an exemplary embodiment, the active 3D panel 400 is turned off during the transition period TT, during which the crosstalk image is displayed on the display panel 200.

As described above, the active 3D panel 400 is turned off during the transition period TT based on the LC response time RT.

According to an exemplary embodiment, during the transition period during which the frame image displayed on the display panel is changed from the odd frame image into the even frame image, or from the even frame image into the odd frame image, the active 3D panel 400 is turned off such that the crosstalk image is effectively prevented from being viewed by the viewer.

Figure 8:
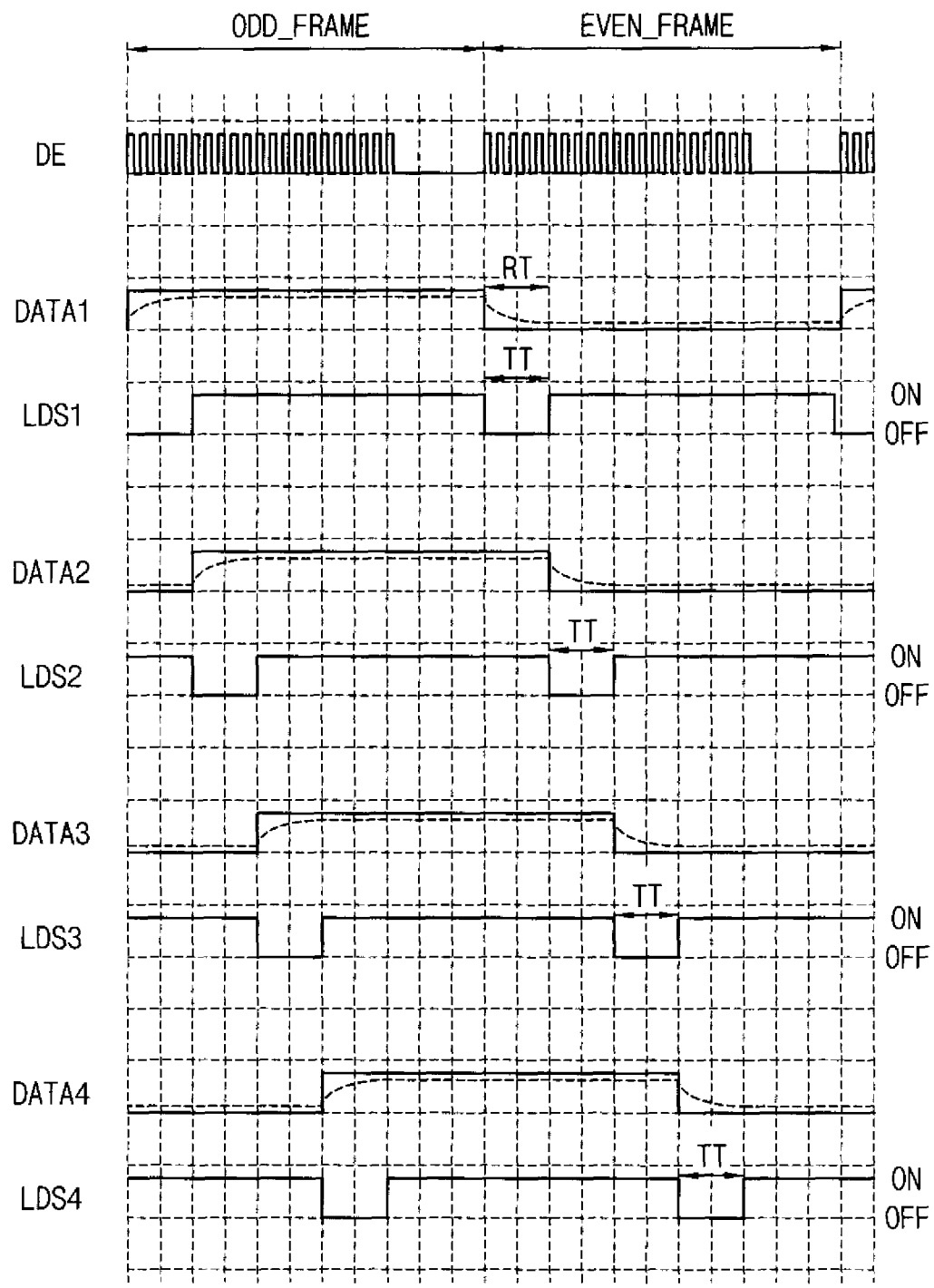
FIG. 8 is a signal timing diagram illustrating an exemplary embodiment of a method of driving a light-source unit according to the invention.

FIG. 8 is a signal timing diagram illustrating a method of driving a light-source unit according to the invention.

Hereinafter, for convenience of description, the odd frame image OFI may be referred to as a white image, and the even frame image EFI may be referred to as a block image, and an exemplary embodiment, where the light-source 600 includes four light-emitting blocks, will be described in detail.

Referring to FIGS. 1, 3 and 8, during the odd-numbered frame ODD_FRAME, the data signal of the odd frame image OFI is sequentially applied to the display panel 200 in the scanning direction.

An exemplary embodiment of a method of driving four display blocks of the display panel 200 corresponding to the four light-emitting blocks of the light-source 600 will be described. In one exemplary embodiment, for example, a first data signal DATA1 of the odd frame image OFI is applied to a first display block of the display panel 200, a second data signal DATA2 of the odd frame image OFI is applied to a second display block of the display panel 200, a third data signal DATA3 of the odd frame image OFI is applied to a third display block of the display panel 200, and a fourth data signal DATA4 of the odd frame image OFI is applied to a fourth display block of the display panel 200.

A first light-driving signal LDS1 is applied to a first light-emitting block of the light-source 600 to emit the light during a period, during which the first data signal DATA1 is applied to the first display block, a second light-driving signal LDS2 is applied to a second light-emitting block of the light-source 600 to emit the light during a period, during which the second data signal DATA2 is applied to the second display block, a third light-driving signal LDS3 is applied to a third light-emitting block of the light-source 600 to emit the light during a period, during which the third data signal DATA3 is applied to the third display block, and a fourth light-driving signal LDS4 is applied to a fourth light-emitting block of the light-source 600 to emit the light during a period, during which the fourth data signal DATA4 is applied to the fourth display block.

In such an embodiment, during the even-numbered frame EVEN_FRAME, a data signal of the even frame image EFI is sequentially applied to the display blocks of the display panel 200, and a light-driving signal is sequentially applied to the light-emitting blocks of the light-source in synchronization with the data signal of the even frame image EFI.

Referring to the first data signal DATA1 applied to the first display block of the display panel 200, the even frame image EFI is displayed on the first display block without a crosstalk from a timing delayed by an LC response time RT from when the first data signal DATA1 of the even frame image EFI is applied to the first display block.

In such an embodiment, a driving period of the display panel 200 includes a transition period TT during which the odd or even frame image OFI or EFI is changed into the even or odd frame image EFI or OFI, respectively. The transition period TT may be set in an early part of a frame period, e.g., from an initial point of the frame period to a predetermined time point of the frame period. In the transition period TT, the display panel 200 may display a crosstalk image, in which the odd frame image OFI and the even frame image EFI are mixed.

Therefore, according to an exemplary embodiment, the light-emitting block is turned off during the transition period TT during which the crosstalk image is displayed on the display panel 200.

As described above, the light-emitting block of the light-source 600 is turned off during the transition period TT based on the LC response time RT such that the crosstalk image is effectively prevented from being viewed by the viewer.

Although not shown in figures, in such an embodiment, the active 3D panel 400 may be turned off during the transition period TT as described in FIG. 7.

Figure 9:
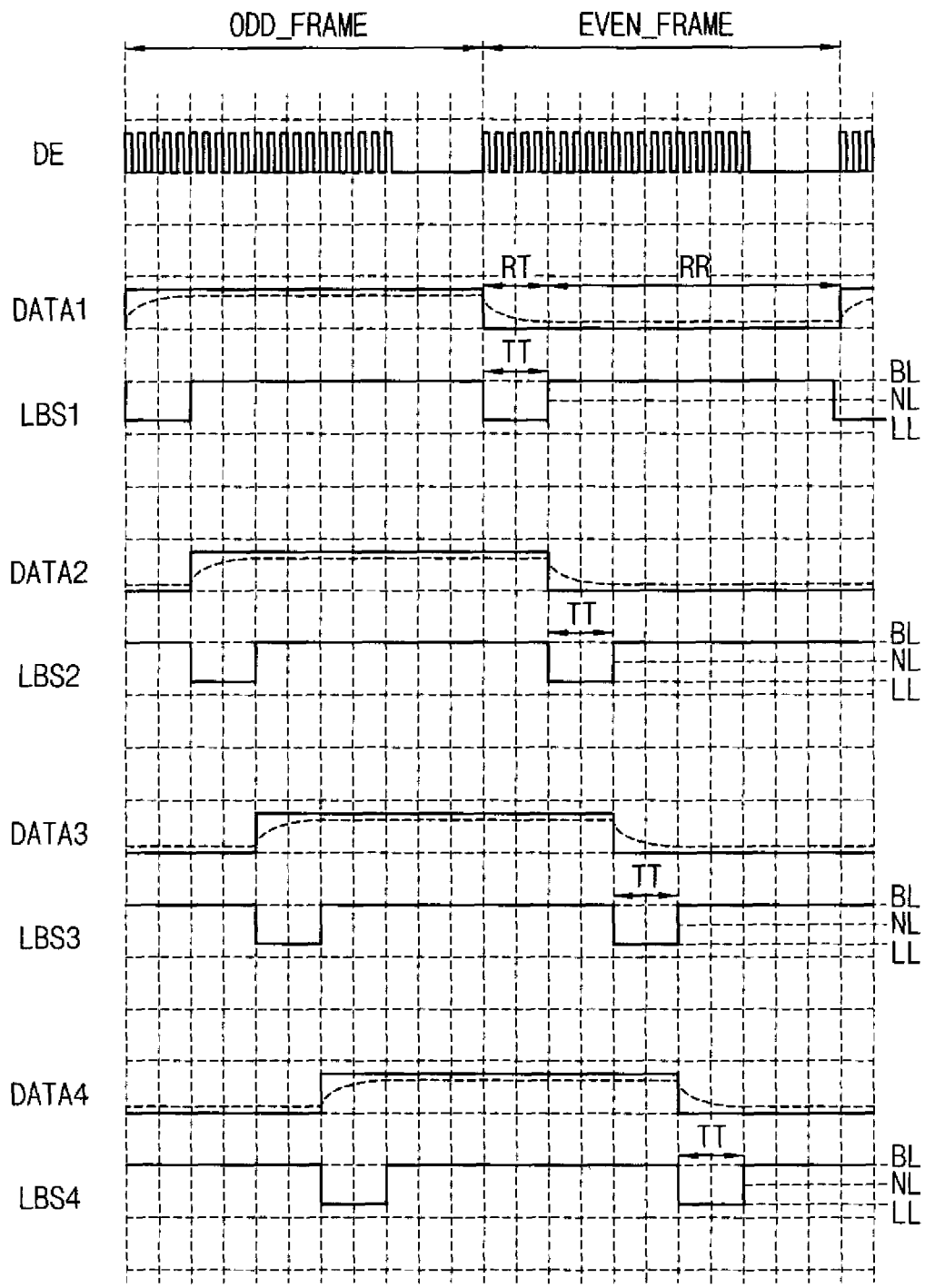
FIG. 9 is a signal timing diagram illustrating an alternative exemplary embodiment of a method of driving a light-source unit according to the invention.

FIG. 9 is a signal timing diagram illustrating an alternative exemplary embodiment of a method of driving a light-source unit according to the invention.

Referring to FIG. 9, according to an exemplary embodiment, the method of driving the light-source includes driving the light-emitting block to have a low luminance level LL lower than a reference luminance level NL during the transition period TT, which is located in an early part of the frame period, and driving the light-emitting block to have a boosting luminance level BL higher than the reference luminance level NL during a remaining period RR, which is from a period after the transition period TT to a period before a next frame period.

According to an exemplary embodiment, during the remaining period RR during which a normal 3D image is displayed on the display block without a crosstalk, the light-emitting block may emit the light having the boosting luminance level such that the normal 3D image having a high luminance is displayed. In such an embodiment, during the transition period during which a crosstalk image is displayed on the display block, the light-emitting block may emit the light having the lower luminance level such that the crosstalk image viewed by the viewer has substantially low luminance. In an exemplary embodiment, the 3D image is displayed with high luminance compared to the exemplary embodiment in FIG. 8.

Although not shown in figures, in such an embodiment, the active 3D panel 400 may be turned off during the transition period TT as described in FIG. 7.

Figure 10:
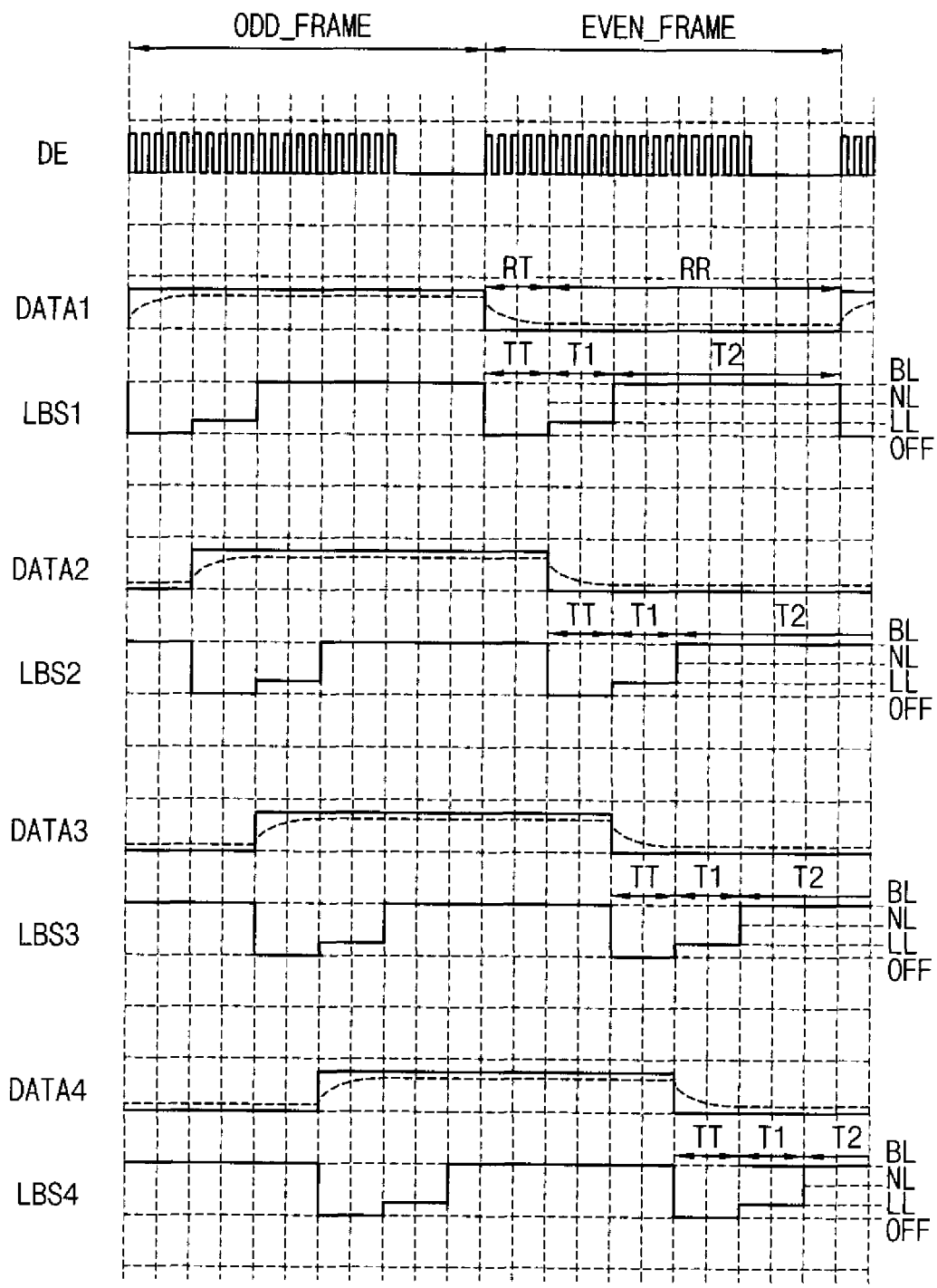
FIG. 10 is a signal timing diagram illustrating another alternative exemplary embodiment of a method of driving a light-source unit according to the invention.

FIG. 10 is a signal timing diagram illustrating another alternative exemplary embodiment of a method of driving a light-source unit according to the invention.

Referring to FIG. 10, an exemplary embodiment of the method of driving the light-source includes turning off the light-emitting block during the transition period TT, which is located in an early part of the frame period, driving the light-emitting block to have a low luminance level LL lower than a reference luminance level NL during a first period T1 after the transition period TT, and driving the light-emitting block to have a boosting luminance level BL higher than the reference luminance level NL during a second period T2 after the first period T1. The second period T2 may be preset from a period after the first period T1 to a period before a next frame period.

According to an exemplary embodiment, during the remaining period RR during which a normal 3D image is displayed on the display block without a crosstalk, the light-emitting block may emit the light of the boosting luminance level such that the normal 3D image having a high luminance is displayed. However, during the transition period, during which a crosstalk image is displayed on the display block, the light is blocked from being provided to the display block such that the crosstalk image is effectively prevented from being viewed by the viewer. According to an exemplary embodiment, the 3D image may be displayed with low power consumption compared to the exemplary embodiment in FIG. 9.

Figure 11:
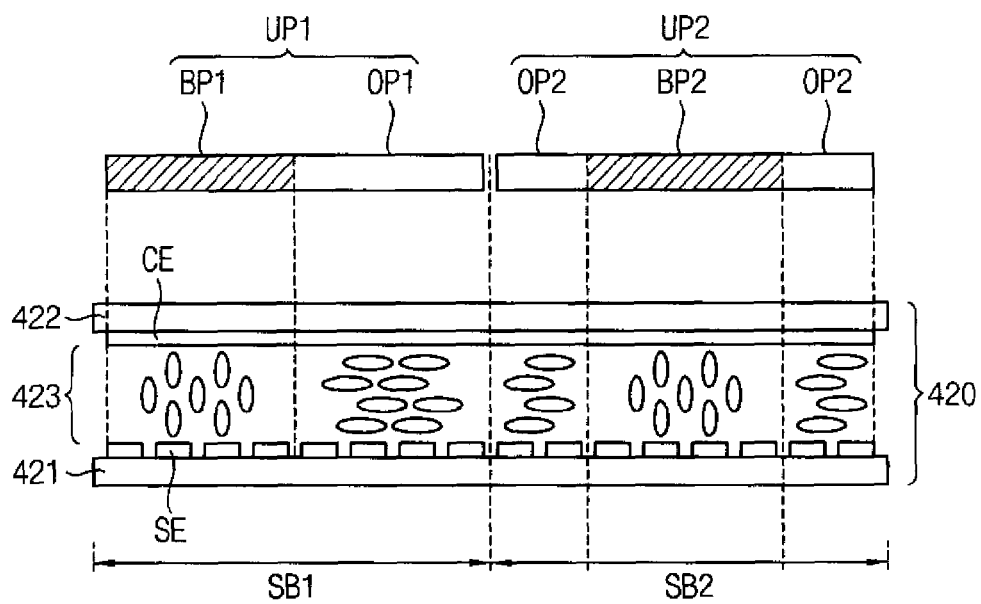
FIG. 11 is a conceptual diagram illustrating an alternative exemplary embodiment of an active 3D panel according to the invention.

FIG. 11 is a conceptual diagram illustrating an alternative exemplary embodiment of an active 3D panel according to the invention.

Referring to FIGS. 1 and 11, according to an exemplary embodiment, the active 3D panel 400 may be an active barrier panel 420.

The active barrier panel 420 may include a first substrate 421, a second substrate 422 and a LC layer 423.

The first substrate 421 includes a plurality of shutter electrodes SE, and the second substrate 422 includes a common electrode CE opposite to the shutter electrodes SE. The LC layer 423 operates in first barrier mode and a second barrier mode based on driving signals applied to the shutter electrodes SE.

In the first barrier mode, the shutter electrodes SE operate as a first barrier pattern UP1, and the first barrier pattern UP1 includes a first opening OP1 that transmits the light and a first barrier BP1 that blocks the light. In the second barrier mode, the shutter electrodes SE operate as a second barrier pattern UP2, and the second barrier pattern UP2 includes a second opening OP2 and a second barrier BP2, which are shifted from the first opening OP1 and the first barrier BP 1. In one exemplary embodiment, for example, the second opening OP2 and the second barrier BP2 are shifted from the first opening OP1 and the first barrier BP1 in a horizontal direction.

The active barrier panel 420 is divided into a plurality of shutter blocks SB1 and SB2. Each of the shutter blocks SB1 and SB2 operates in the first barrier mode or the second barrier mode based on the 3D image displayed on the display block of the display panel 200.

In one exemplary embodiment, for example, a first shutter block SB1 corresponding to the image block including the left-eye image operates in the first barrier mode including the first barrier pattern UP1. A second shutter block SB2 corresponding to the image block including the right-eye image operates in the second barrier mode including the second barrier pattern UP2.

Therefore, the first and second shutter blocks SB1 and SB2 operate in the first or second barrier mode such that the left-eye image is directed toward the left-eye of the viewer, and the right-eye image is directed toward the right-eye of the viewer.

Figure 12:
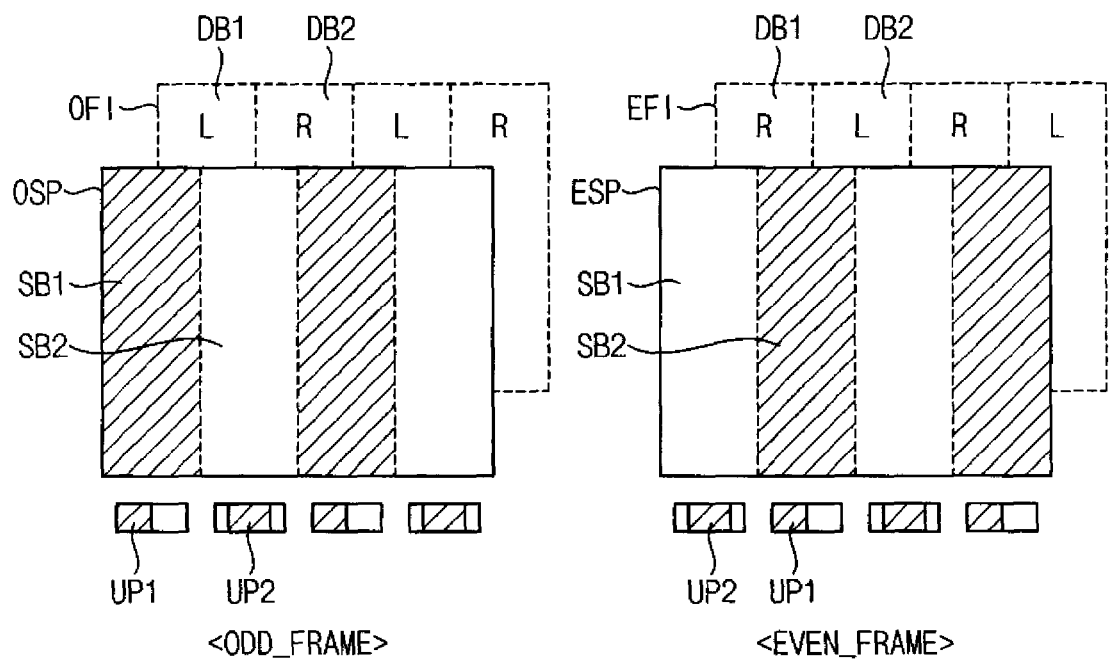
FIG. 12 is a conceptual diagram illustrating an exemplary embodiment of a method of driving the active 3D panel as shown in FIG. 11.

FIG. 12 is a conceptual diagram illustrating an exemplary embodiment of a method of driving the active 3D panel as shown in FIG. 11.

Referring to FIGS. 11 and 12, according to the exemplary embodiment, a frame image includes a plurality of image blocks which extends in a vertical direction and is arranged in a horizontal direction. The image blocks alternately display a left-eye image L and a right-eye image R.

In one exemplary embodiment, for example, as shown in FIG. 12, the odd frame image OFI, which is displayed on the display panel 200 during the odd-numbered frame ODD_FRAME, includes a first image block DB1 including the left-eye image L and a second image block DB2 including the right-eye image R.

In such an embodiment, the active barrier panel 420 includes a first shutter block SB1 and a second shutter block SB2, and operates as an odd 3D pattern OSP corresponding to the odd frame image OFI. The odd 3D pattern OSP includes a first barrier pattern UP1 corresponding to the left-eye image and a second barrier pattern UP2 corresponding to the right-eye image. The first shutter block SB1 of the odd 3D pattern OSP operates in a first barrier mode corresponding to the left-eye image L, and the first barrier mode corresponds to the first barrier pattern UP1. The second shutter block SB2 of the odd 3D pattern OSP operates in a second barrier mode corresponding to the right-eye image R, and the second barrier mode corresponds to the second barrier pattern UP2. The first barrier pattern UP1 may direct the left-eye image toward the left-eye of the viewer, and the second barrier pattern UP2 may direct the right-eye image toward the right-eye of the viewer.

An even frame image EFI, which is displayed on the display panel 200 during the even-numbered frame EVEN_FRAME, is opposite to the odd frame image OFI. As shown in FIG. 12, the even frame image EFI includes a second image block DB2 including the left-eye image L, and a first image block DB 1 including the right-eye image R.

In such an embodiment, the active barrier panel 420 operates as an even 3D pattern ESP corresponding to the even frame image EFI. The even 3D pattern ESP includes a first shutter block SB1 and a second shutter block SB2. The first shutter block SB1 of the even 3D pattern ESP operates in the second barrier mode corresponding to the right-eye image R and the first barrier mode corresponds to the second barrier pattern UP2. The second shutter block SB2 of the even 3D pattern ESP operates in the first barrier mode corresponding to the left-eye image L, and the first barrier mode corresponds to the first barrier pattern UP 1. The first barrier pattern UP1 may direct the left-eye image toward the left-eye of the viewer, and the second barrier pattern UP2 may direct the right-eye image toward the right-eye of the viewer.

According to an exemplary embodiment, the left-eye image and the right-eye image are included in the frame image such that a flicker of the 3D image is substantially decreased compared to a method of alternately displaying a left-eye frame image and a right-eye frame image every frame period.

In such an embodiment, the active barrier panel 420 may be designed to have the image block of various shapes, as shown in FIGS. 4 to 6.

In such an embodiment, the active barrier panel 420 may be turned off during the transition period TT, which is preset in the early part of the frame period, as described in FIG. 7.

In such an embodiment, the light-source may turn off the light during the transition period TT, as shown in FIG. 8. In an alternative exemplary embodiment, as shown in FIG. 9, the light-source may drive to have the low luminance level during the transition period TT and drive to have the boosting luminance level during the remaining period RR. In an alternative exemplary embodiment, as shown in FIG. 10, the light-source may turn off the light during the transition period TT, drive to have the low luminance level during the first period T1 and drive to have the boosting luminance level during the second period T2.

Figure 13:
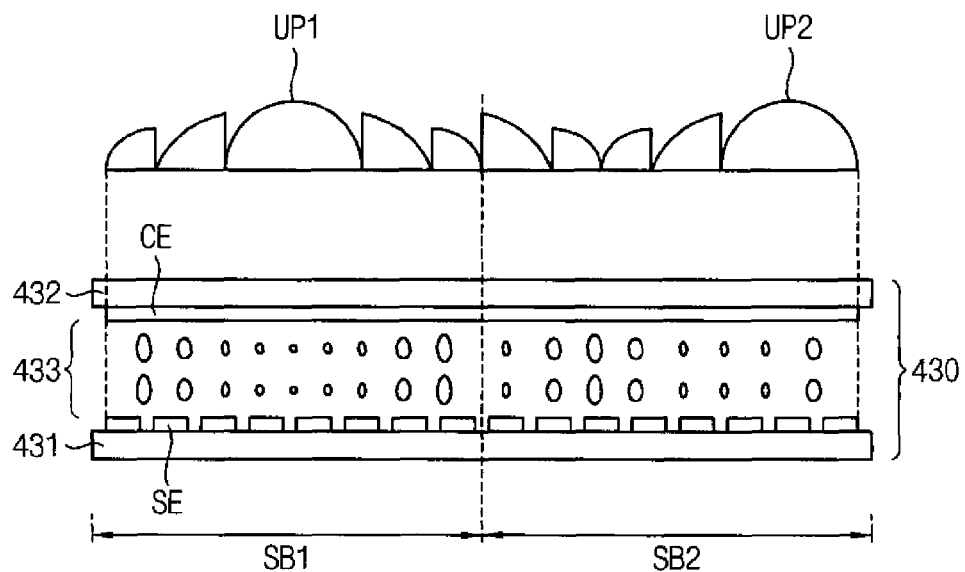
FIG. 13 is a conceptual diagram illustrating another alternative exemplary embodiment of an active 3D panel according to the invention.

FIG. 13 is a conceptual diagram illustrating another alternative exemplary embodiment of an active 3D panel according to the invention.

Referring to FIGS. 1 and 13, an exemplary embodiment of the active 3D panel may be an active lens panel 430.

In such an embodiment, the active lens panel 430 may include a first substrate 431, a second substrate 432 and an LC layer 433.

The first substrate 431 includes a plurality of shutter electrodes SE, and the second substrate 432 includes a common electrode CE opposite to the shutter electrodes SE. The LC layer 433 operates in a first lens mode and a second lens mode based on driving signals applied to the shutter electrodes SE.

In the first lens mode, the shutter electrodes SE operate as a first lens pattern UP1, and the first lens pattern UP1 directs, e.g., diffracts, the incident light toward the left-eye of the viewer. In the second lens mode, the shutter electrodes SE operate as a second lens pattern UP2, and the second lens pattern UP2 directs the incident light toward the right-eye of the viewer. In one exemplary embodiment, for example, the second lens pattern UP2 may be shifted with respect to the first lens pattern UP 1 in a horizontal direction.

The active lens panel 430 is divided into a plurality of shutter blocks SB1 and SB2. Each of the shutter blocks SB1 and SB2 operates in the first lens mode or the second lens mode corresponding to the left-eye and right-eye images displayed on the display blocks of the display panel 200.

In one exemplary embodiment, for example, a first shutter block SB1 corresponding to the image block including the left-eye image operates in the first lens mode including the first lens pattern UP1. A second shutter block SB2 corresponding to the image block including the right-eye image operates in the second lens mode including the second lens pattern UP2.

Therefore, the first and second shutter blocks SB1 and SB2 operate in the first or second lens mode such that the left-eye image is directed, e.g., diffracted, toward the left-eye of the viewer and the right-eye image is directed, e.g., diffracted, toward the right-eye of the viewer.

Figure 14:
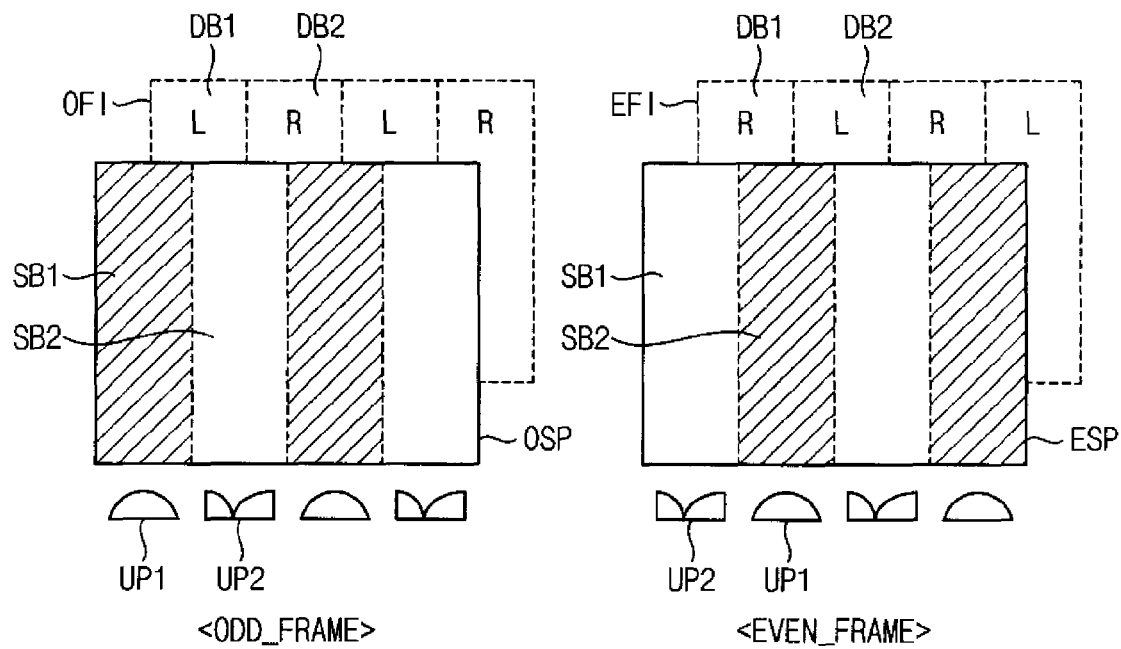
FIG. 14 is a conceptual diagram illustrating an exemplary embodiment of a method of driving the active 3D panel as shown in FIG. 13.

FIG. 14 is a conceptual diagram illustrating an exemplary embodiment of a method of driving the active 3D panel as shown in FIG. 13.

Referring to FIGS. 13 and 14, according to an exemplary embodiment, a frame image includes a plurality of image blocks which extends a vertical direction and is arranged in a horizontal direction. The image blocks alternately display a left-eye image L and a right-eye image R.

In one exemplary embodiment, for example, as shown in FIG. 14, the odd frame image OFI, which is displayed on the display panel 200 during the odd-numbered frame ODD_FRAME, includes a first image block DB1 including the left-eye image L and a second image block DB2 including the right-eye image R.

In such an embodiment, the active lens panel 430 includes a first shutter block SB1 and a second shutter block SB2 and operates as an odd 3D pattern OSP corresponding to the odd frame image OFI. The odd 3D pattern OSP includes a first lens pattern UP1 corresponding to the left-eye image and a second lens pattern UP2 corresponding to the right-eye image. The first shutter block SB1 operates in a first lens mode corresponding to the left-eye image L, and the first lens mode corresponds to the first lens pattern UP1. The second shutter block SB2 of the odd 3D pattern OSP operates in a second lens mode corresponding to the right-eye image R, and the second lens mode corresponds to the second lens pattern UP2. The first lens pattern UP1 may direct, e.g., diffract, the left-eye image toward the left-eye of the viewer, and the second lens pattern UP2 may direct, e.g., diffract, the right-eye image toward the right-eye of the viewer.

An even frame image EFI, which is displayed on the display panel 200 during the even-numbered frame EVEN_FRAME, is opposite to the odd frame image OFI. As shown in FIG. 14, the even frame image EFI includes a second image block DB2 including the left-eye image L and a first image block DB 1 including the right-eye image R.

Thus, the active lens panel 430 includes a first shutter block SB1 and a second shutter block SB2 and operates as an even 3D pattern ESP corresponding to the even frame image EFI. The even 3D pattern ESP includes a first lens pattern UP1 corresponding to the left-eye image and a second lens pattern UP2 corresponding to the right-eye image. The first shutter block SB1 of the even 3D pattern ESP operates in the second lens mode corresponding to the right-eye image R, and the first lens mode corresponds to the second lens pattern UP2. The second shutter block SB2 of the even 3D pattern ESP operates in the first lens mode corresponding to the left-eye image L, and the first lens mode corresponds to the first lens pattern UN. The first lens pattern UP1 may direct, e.g., focus, the left-eye image toward the left-eye of the viewer, and the second lens pattern UP2 may direct, e.g., focus, the right-eye image toward the right-eye of the viewer.

According to an exemplary embodiment, the left-eye image and the right-eye image are included in the frame image such that a flicker of the 3D image is substantially decreased compared to a method of alternately displaying a left-eye frame image and a right-eye frame image every frame period.

In an exemplary embodiment, the active lens panel 430 may be designed to have the image block of various shapes, as shown in FIGS. 4 to 6.

In such an embodiment, the active barrier panel 420 may be turned off during the transition period TT, which is preset in the early part of the frame period, as described in FIG. 7.

In such an embodiment, as shown in FIG. 8, the light-source may turn off the light during the transition period TT. In an alternative exemplary embodiment, as shown in FIG. 9, the light-source may drive to have the low luminance level during the transition period TT and drive to have the boosting luminance level during the remainder period RR. In an alternative exemplary embodiment, as shown in FIG. 10, the light-source may turn off the light during the transition period TT, drive to have the low luminance level during the first period T1 and drive to have the boosting luminance level during the second period T2.

Figure 15:
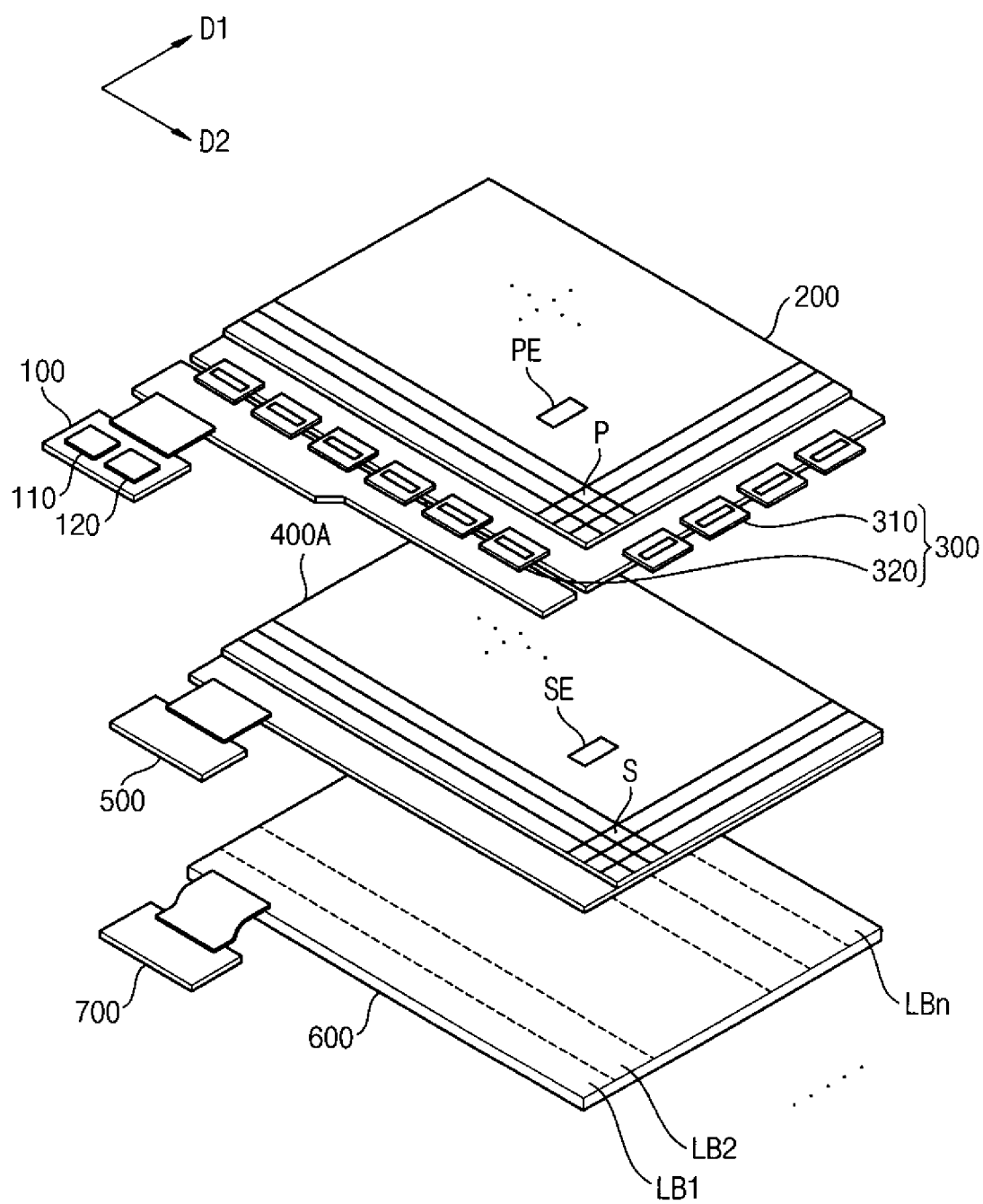
FIG. 15 is a block diagram illustrating an exemplary embodiment of a 3D image display apparatus according to the invention.

FIG. 15 is a block diagram illustrating an alternative exemplary embodiment of a 3D image display apparatus according to the invention.

Referring to FIG. 15, according to the exemplary embodiment, the display apparatus may include a main driving part 100, a display panel 200, a display driving part 300, an active 3D panel 400A, a 3D driving part 500, a light-source 600 and a light-source driving part 700.

The display apparatus in FIG. 15 is substantially the same as the display apparatus shown in FIG. 1 except for the position of the active 3D panel 400A. The same or like elements shown in FIG. 15 have been labeled with the same reference characters as used above to describe the exemplary embodiments of the display apparatus shown in FIG. 1, and any repetitive detailed description thereof will hereinafter be omitted or simplified.

According to an exemplary embodiment, as shown in FIG. 15, the active 3D panel 400A is disposed between the display panel 200 and the light-source 600. The active 3D panel 400A may be variously designed as in the exemplary embodiments described above.

In one exemplary embodiment, for example, the active 3D panel 400A may be the active barrier panel or the active lens panel as in the exemplary embodiments described above.

In such an embodiment, the active 3D panel 400A may be designed to have the image block of various shapes, as shown in FIGS. 4 to 6.

In such an embodiment, the active 3D panel 400A may be turned off during the transition period TT, which is preset in the early part of the frame period, as described in FIG. 7.

In such an embodiment, as shown in FIG. 8, the light-source according to the exemplary embodiment may turn off the light during the transition period TT. In an alternative exemplary embodiment, as shown in FIG. 9, the light-source may drive to have the low luminance level during the transition period TT and drive to have the boosting luminance level during the remaining period RR. In an alternative exemplary embodiment, as shown in FIG. 10, the light-source may turn off the light during the transition period TT, drive to have the low luminance level during the first period T1 and drive to have the boosting luminance level during the second period T2.

The foregoing is illustrative of the invention and is not to be construed as limiting thereof. Although a few exemplary embodiments of the invention include been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of displaying a three-dimensional (3D) image, the method comprising:
generating a frame image to be displayed on a display panel, wherein the frame image comprises a plurality of image blocks, and the image blocks have a left-eye image and a right-eye image which are alternately arranged; and
driving each of a plurality of shutter blocks in an active 3D panel in a first mode corresponding to the left-eye image or a second mode corresponding to the right-eye image such that a left eye and a right eye of a viewer view the left-eye image and the right-eye image, respectively,
wherein an odd frame image is displayed on the display panel during an odd frame, and the display panel displays an even frame image including the left-eye and right-eye images and, arranged opposite to the arrangement of the odd frame image, during an even frame.

2. The method of clam 1, wherein
each of the shutter blocks comprises a plurality of shutter electrodes arranged substantially in a matrix form, and
the active 3D panel is sequentially driven in a scanning direction of the display panel.

3. The method of clam 2, wherein
each of the image blocks extends substantially in a horizontal direction, and
the image blocks are arranged substantially in a vertical direction.

4. The method of clam 2, wherein
each of the image blocks extends substantially in a vertical direction, and
the image blocks are arranged substantially in a horizontal direction.

5. The method of clam 2, wherein the image blocks are arranged substantially in a matrix form.

6. The method of clam 1, further comprising:
turning off the active 3D panel during a transition period, which is preset in an early part of a frame period.

7. The method of clam 1, further comprising:
sequentially driving a plurality of light-emitting blocks of a light source in a scanning direction of the display panel,
wherein the light-emitting blocks are turned off during a transition period, which is preset in an early part of a frame period, driven to have a low luminance level lower than a reference luminance level during a first period after the transition period, and driven to have a boosting luminance level higher than the reference luminance level during a second period after the first period.

8. The method of clam 1, further comprising:
sequentially driving a plurality of light-emitting blocks of a light source in a scanning direction of the display panel,
wherein the light-emitting blocks are driven to have a low luminance level lower than a reference luminance level during a transition period, which is preset in an early part of a frame period, and driven to have a boosting luminance level higher than the reference luminance level during a remaining period of the frame period after the transition period.

9. The method of clam 1, wherein
the active 3D panel is an active polarization panel, and
the active polarization panel changes the left-eye image into the left-eye image of a first polarized-light in the first mode and changes the right-eye image into the right-eye image of a second polarized-light in the second mode.

10. The method of clam 1, wherein
the active 3D panel is an active barrier panel, and
the active barrier panel operates in a first barrier pattern, which directs the left-eye image toward the left-eye of the viewer in the first mode, and operates in a second barrier pattern, which directs the right-eye image toward the right-eye of the viewer in the second mode.

11. The method of clam 1, wherein
the active 3D panel is an active lens panel, and
the active lens panel operates as a first lens pattern, which directs the left-eye image toward the left-eye of the viewer in the first mode, and operates as a second lens pattern, which directs the right-eye image toward the right-eye of the viewer in the second mode.

12. A display apparatus comprising:
an image processing part which generates a frame image comprising a plurality of image blocks, wherein the image blocks comprises a left-eye image and a right-eye image which are alternately arranged;
a display panel which displays the frame image; and
an active three-dimensional (3D) panel comprising a plurality of shutter blocks, wherein the active 3D panel drives each of the shutter blocks in a first mode corresponding to the left-eye image or a second mode corresponding to the right-eye image such that a left eye and a right eye of a viewer view the left-eye image and the right-eye image,
wherein an odd frame image is displayed on the display panel during an odd frame, and the display panel displays an even frame image including the left-eye and right-eye images, and arranged opposite to the arrangement of the odd frame image, during an even frame.

13. The display apparatus of clam 12, wherein
the shutter blocks comprise a plurality of shutter electrodes arranged substantially in a matrix form, and
the active 3D panel is sequentially driven in a scanning direction of the display panel.

14. The display apparatus of clam 12, further comprising:
a 3D driving part which turns off the active 3D panel during a transition period preset in an early part of a frame period.

15. The display apparatus of clam 12, further comprising:
a light-source comprising a plurality of light-emitting blocks; and a light-source driving part which sequentially drives the light-emitting blocks in a scanning direction of the display panel.

16. The display apparatus of clam 15, wherein the light-source driving part turns off the light-emitting blocks during a transition period preset in an early part of a frame period, drives the light-emitting blocks to have a low luminance level lower than a reference luminance level during a first period after the transition period, and drives the light-emitting blocks to have a boosting luminance level higher than the reference luminance level during a second period after the first period.

17. The display apparatus of clam 15, wherein the light-source driving part drives the light-emitting blocks to have a low luminance level lower than a reference luminance level during a transition period preset in an early part of a frame period, and drives the light-emitting blocks to have a boosting luminance level higher than the reference luminance level during a remaining period of the frame period after the transition period.

18. The display apparatus of clam 12, wherein
the active 3D panel is an active polarization panel, and
the active polarization panel changes the left-eye image into the left-eye image of a first polarized-light in the first mode, and changes the right-eye image into the right-eye image of a second polarized-light in the second mode.

19. The display apparatus of clam 12, wherein
the active 3D panel is an active barrier panel, and
the active barrier panel operates as a first barrier pattern which directs the left-eye image toward the left-eye of the viewer in the first mode, and operates as a second barrier pattern which directs the right-eye image toward the right-eye of the viewer in the second mode.

20. The display apparatus of clam 12, wherein
the active 3D panel is an active lens panel, and
the active lens panel operates as a first lens pattern which directs the left-eye image toward the left-eye of the viewer in the first mode, and operates as a second lens pattern which directs the right-eye image toward the right-eye of the viewer in the second mode.

* * * * *